United States Patent
Ardkapan et al.

(10) Patent No.: US 12,550,828 B2
(45) Date of Patent: Feb. 17, 2026

(54) FLOWER BOUQUET APPARATUS

(71) Applicants: Siamak Rahimi Ardkapan, Charlottenlund (DK); Artin Nasseri Hodanloo, Nærum (DK)

(72) Inventors: Siamak Rahimi Ardkapan, Charlottenlund (DK); Artin Nasseri Hodanloo, Nærum (DK)

( * ) Notice: Subject to any disclaimer, the term of this patent is extended or adjusted under 35 U.S.C. 154(b) by 0 days.

(21) Appl. No.: 18/849,987

(22) PCT Filed: Mar. 23, 2023

(86) PCT No.: PCT/EP2023/057498
§ 371 (c)(1),
(2) Date: Sep. 23, 2024

(87) PCT Pub. No.: WO2023/180455
PCT Pub. Date: Sep. 28, 2023

(65) Prior Publication Data
US 2025/0212734 A1    Jul. 3, 2025

(30) Foreign Application Priority Data
Mar. 24, 2022 (DK) .................................. 202200258

(51) Int. Cl.
*A01G 5/02* (2006.01)

(52) U.S. Cl.
CPC ...................................... *A01G 5/02* (2013.01)

(58) Field of Classification Search
CPC ...................................................... A01G 5/02
See application file for complete search history.

(56) References Cited

U.S. PATENT DOCUMENTS

| | | | |
|---|---|---|---|
| 7,213,365 B2 * | 5/2007 | Van Zuylen | A01G 5/02 47/41.01 |
| 8,438,780 B1 * | 5/2013 | Malavenda | A01G 5/02 47/58.1 CF |
| 2005/0072044 A1 * | 4/2005 | Van Zuylen | A01G 5/02 47/41.11 |
| 2013/0047502 A1 | 2/2013 | Wargo | |
| 2015/0059240 A1 * | 3/2015 | Van Bers | A01G 5/02 47/41.13 |
| 2016/0353670 A1 | 12/2016 | Agababa | |

FOREIGN PATENT DOCUMENTS

| | | |
|---|---|---|
| CN | 106105809 A | 11/2016 |
| EP | 2856857 A2 | 4/2015 |
| GB | 2587433 A | 3/2021 |
| WO | 03/039241 A1 | 5/2003 |
| WO | 2013/125943 A1 | 8/2013 |

OTHER PUBLICATIONS

International Search Report issued in PCT/EP2023/057498; mailed Nov. 7, 2023.

* cited by examiner

*Primary Examiner* — Jessica B Wong
(74) *Attorney, Agent, or Firm* — Elevated IP, LLC

(57) ABSTRACT

The present invention concerns an apparatus and a method for preparing a spiral shaped flower bouquet from multiple flowers, each flower having a stem, which apparatus secures a perfect shape of the flower bouquet and at the same time save time and injuries of the person making the flower bouquet.

16 Claims, 10 Drawing Sheets

FLOWER BOUQUET APPARATUS

This invention relates to a tool that produces spirally arranged flower bouquets.

BACKGROUND

The cut flower industry is a rather large industry and starts from cultivating the flowers to delivering them to the end-user. One of the challenges of delivering a bouquet of flowers is to make it in a spiral shape. This shape eliminates the risk of breaking the delicate stems of the flowers. This is done professionally by the hands of florists. It is a time-consuming and hard process.

Many florists complain regarding health problems of shoulder pain, back pain, and wrist pain due to the time that is required to be used for preparing a bouquet in the hand of a florist. On average a florist can produce five bouquets in an hour. This increases the labor cost and consequently the price of the bouquets. A problem with producing bouquets by hand is that the flowers are kept outside of the water for a few minutes. The result would be more deteriorated flowers and extra cost to the shop.

Some inventions have been made to arrange the cut flowers in a spiral manner by using a more rigid body than the flower stem to guide the stems into the desired spiral shape. However, these attempts may break the flower stems.

One attempt to aid a user in arranging the cut flowers can be seen in patent EP2856857. The invention creates spiral flower bouquets using a device with rigid parts that may break the stems of the flowers easily during the production process, and it has been designed to be used for flowers without any branches.

Another attempt to aid a user in arranging the flowers can be seen in patent CN106105809. The invention has used perforated plates to produce the desired spiral shape. However, the stems may break, and the sizes of the holes may not be suitable for all stem sizes.

In the prior art, WO03/039241 a device for making spiral bouquets is described. The device includes several holes where flowers should be placed one by one in the holes. It is a time-consuming process compared with the current invention where all flowers are placed together in an oval shape container. The other problem of WO03/039241 is that by twisting the flowers where they are placed in holes, it will be hard to take out them as the friction will be increased considerably. Every stem will be strongly attached to the inner surface of the holes and it will be hard to remove the flowers. Some stems of the flowers are fragile and may break due to the rotation according to WO03/039241. While in the current invention, the flowers are placed all together and one fragile flower will not be under rotation tension.

The prior art, WO2013125943 describes a flower bouquet maker which comprises two plates with holes where each flower should pass through the holes of the upper plate. Then the bottom part of each flower stem should be placed in the lower holes. The bouquet will be made by rotating the upper plate while the lower plate is fixed. The process of passing each flower through the holes is a time-consuming process. In the current invention, all flowers are placed at once and the lower oval shape container rotates to make a bouquet in less than one minute. The other problem of WO2013125943 is that many flowers do not have straight stems. Therefore, it will be hard, if not impossible, for the flowers to pass through both upper and lower holes.

In the prior art of US2013/0047502, there is a base that comprises many holes. Each flower should be placed in the holes. Then the spiral bouquet may be built due to the orientation of the holes. Making spiral bouquets according to US2013/0047502 needs considerable time since each individual flower should be placed in the holes. The flower stems are not necessarily the same size and straight to make an ideal spiral shape. While in the current invention all flowers are placed in the oval container at one moment, and therefore the process of making spiral bouquets is much faster than these prior arts.

SUMMARY OF INVENTION

To overcome these problems, the present invention proposes a bouquet producing tool and process, for producing bouquets from cut flowers, comprising a spiral maker which is an oval shape cylinder, such that it is arranging the flowers in a spiral manner, integrated with a brush-based gripper that holds the higher side of the flowers at the desired angles and heights when a florist is designing the bouquet arrangement.

The current invention relates to the process of making flower bouquets. Typically, the process includes inter alia passing the stem of each flower through brush hairs of the brush-based gripper at a desired angle and height, gripping the inserted flowers by a soft gripper, putting the bottom of the flower stems inside an oval cylinder, and spinning the oval cylinder to create a spiral arrangement for the flowers of the bouquet. During the operation of the apparatus, the oval cylinder is rotated and is in contact with flower stems. Each stem is pressed when it starts passing the minor axis of the oval and released when it has passed the minor axis of the oval. The bottom of the released stem jumps out and takes a position at the lowest tension and the highest stability. Preferably, in order to have a spiral arrangement of the flowers, the minor axis of the oval cross-section of the cylinder should be less than the diameter of the final flower bouquet and the major axis of the oval is bigger than two times of the diameter of the final bouquet. The height of the cylinder is typically at least one-fifth of the height of the used flowers. The major axis of the oval is preferably equal to or larger than the height of the cylinder.

In a first aspect the present invention relates to an apparatus (10) for preparing a spiral shaped flower bouquet (50) from multiple flowers, each flower having a stem (52), comprising:
a) a first gripper (12, 14, 16, 18) comprising at least two gripping elements (12, 14, 16, 18), wherein each gripping element (12, 14, 16, 18), comprises a brush head (12, 14, 16, 18), comprising multiple bristles (20, 22) and is movable from a first position where the multiple bristles of each brush head are entangled (30) and forms a mesh (30) to a second position where the multiple bristles of each brush head are remote from each other, wherein said multiple bristles (30) when in the first position are capable of holding the stems of the flowers in the mesh at a desired position and height without breaking the stems,
b) a second gripper (24, 26) comprising at least two soft finger means (24, 26), wherein each soft finger mean (24, 26) is movable in a substantially horizontal plane from a first position remote from each other to a second position creating a defined space between the at least two soft finger means, which defined space is adapted to hold the stems in the desired position and height, without breaking the stems, and wherein the second gripper (24, 26) when in the second position is movable (28) in a substantially vertical direction to position the stems in a desired position, c) a removable elongated rod-shaped element (32) having an axis wherein at least a part of the axis is adapted to be positioned in a center of the mesh of the entangled multiple bristles (30) when said multiple bristles are in the first position (30) and wherein the axis (32) is substantially perpendicular to the entangled multiple bristles (30), wherein the elongated rod-shaped element (32) extends through the defined space between the at least two soft finger means of the second gripper, and wherein said elongated rod-shaped element (32) is for ensuring that the flower stems are not crossing each other, and d) a rotatable container (34) having a space surrounded by a wall (36) and an opening (38), wherein the opening (38) faces the first gripper (12, 14, 16, 18) when in the first position and the second gripper (24, 26) when in the second position and is adapted to receive the ends of the stems inside the container, wherein at least a part of the space is adapted to receive and hold the ends of the stems wherein the wall (36) surrounding the space has an oval shape, and wherein the container (34, 36, 38) is adapted to rotate clock-wise or counter clock-wise relative to the axis of the elongated rod-shaped element (32) when positioned in the center of the mesh to create the spiral shaped flower bouquet.

In an embodiment the rotatable container has a disc element (40) supporting an end (42) of the container facing away from the opening (38), wherein the disc element (40) has a flat surface facing the end (42) of the container (34, 36) and wherein the flat surface (40) extends beyond the wall (36) of the container (34, 36). In a typical embodiment the rotatable container (34) has a funnel (typically made of a metal or metal alloy or a plastic) (44) for guiding the ends of the stems which funnel (44) has conical shape extending from the opening (38) of the container (36) to receive and guide the ends of the stems inside the container.

In a further embodiment the apparatus comprises an electrical motor (46) adapted to rotate the container when current is applied.

In a still further embodiment the first gripper comprises three or four gripping elements. Preferably four gripping elements.

In a further embodiment the first gripper comprises two upper gripping elements and two lower gripping elements, wherein the upper gripping elements are above the lower gripping elements relative to the rotatable container, which upper and lower gripping elements when in the entangled position are turned 90° relative to each other. This is, in particular, illustrated in FIGS. 9 and 10. In a still further embodiment the four gripping elements, the two upper and the two lower gripping elements, are hold in position by a frame preventing any movement of the individual gripping elements.

In a further embodiment wherein the multiple bristles are made from hair of a mammal, such as a pig, or from metal/metal alloys.

In a further embodiment a part or all of the multiple bristles are curled to increase the friction between flower stems and brushes. Typically, all of the multiple bristles of each gripping element are curled. In another embodiment at least two of the gripping elements have curled multiple bristles.

In a still further embodiment wherein the second gripper comprises two soft finger means wherein each finger means is elongated and made of a soft material to avoid breaking the stems. Preferably, there is one second gripper consisting of two soft finger means. The term "soft finger means" as used herein is interchangeable with "non-rigid finger means".

Typically, the fingers are inflatable to create the softness thereof. Thus, the soft finger means contains air to make them soft and not break the stems.

In a further embodiment each of the first gripper, the second gripper, the removable elongated rod-shaped element and the rotatable container, are fixed to a support element (48) to perform the rotating movements when in operation. Typically, the support element is a chassis (48), typically made from metal or metal alloy and is a supporting box or desk.

In a still further embodiment apparatus has a disc element wherein the rotatable container is fixed to the disc element or is an integrated part of the disc element. Preferably, the disc part and container part can be detached for cleaning purposes.

In a still further embodiment the diameter of the oval shaped part of the container is larger than the smallest diameter of the multiple flower stems of the spiral shaped flower bouquet.

In a still further embodiment the first gripper comprising at least two gripping elements, wherein each gripping element comprises a brush head comprising multiple bristles wherein the multiple bristles have a length of at least 6 centimeters. Typically, the multiple bristles have a length of 6 to 12 centimeters.

In a still further embodiment each brush head has an elongated shape having a first end and a second end opposite each other, wherein the first end is rotatably attached to a support element and the second end is movable from a non-tilted position where the multiple bristles of each brush head are entangled and forms a mesh, to a tilted position where the multiple bristles of each brush head are remote from each other and vice versa, wherein the first end is adapted to rotate about an axis being perpendicular to the elongated shape of each brush head. The preferred degree of angle from the non-tilted position to the maximum tilted position is 0° to 30° where said angle is formed between the center of the axis of the rod (32) and the position of each of the brush head in relation to said axis.

In a still further embodiment each flower has a cut stem, wherein each stem may independently have a similar or a different stem length and/or a similar or different stem diameter.

In a second aspect the present invention relates to a method of making a spiral shaped flower bouquet from multiple flowers comprising inserting the stems of the flowers in the apparatus of the first aspect and/or any one of the embodiments described above and by pressing and releasing the stems of flowers when they are held by the second grippers and rotated in the container, so the stems are placed in an arrangement to have the most stable position which is the spiral shape.

In a third aspect the present invention relates to a method of making a spiral shaped flower bouquet from multiple flowers comprising in an apparatus comprising
  a) a first gripper comprising at least two gripping elements, wherein each gripping element comprises a brush head comprising multiple bristles and is movable from a first position where the multiple bristles of each brush head are entangled and forms a mesh to a second position where the multiple bristles of each brush head are remote from each other, wherein said multiple bristles when in the first position are capable of holding the stems of the flowers in the mesh at a desired position and height without breaking the stems, b) a second gripper comprising at least two soft finger means, wherein each soft finger mean is movable in a substantially horizontal plane from a first position remote from each other to a second position creating a defined space between the at least two soft finger means, which defined space is adapted to hold the stems in the desired position and height, without breaking the stems, and wherein the second gripper when in the second position is movable in a substantially vertical direction to position the stems in a desired position, c) a removable elongated rod-shaped element having an axis wherein at least a part of the axis is adapted to be positioned in a center of the mesh of the entangled multiple bristles when said multiple bristles are in the first position and wherein the axis is substantially perpendicular to the entangled multiple bristles, wherein the elongated rod-shaped element extends through the defined space between the at least two soft finger means of the second gripper, and wherein said elongated rod-shaped element is for ensuring that the flower stems are not crossing each other, and d) a rotatable container having a space surrounded by a wall and an opening, wherein the opening faces the first gripper when in the first position and the second gripper when in the second position and is adapted to receive the ends of the stems inside the container, wherein at least a part of the space is adapted to receive and hold the ends of the stems wherein the wall surrounding the space has an oval shape, and wherein the container is adapted to rotate clock-wise or counter clock-wise relative to the axis of the elongated rod-shaped element when positioned in the center of the mesh to create the spiral shaped flower bouquet;

inserting each flower stem at a desired height and orientation inside the entangled mesh, holding the flowers softly with the second gripper in the second position, rotating the inserted flowers by the rotatable container while they are held by the second gripper in the second position to create the spiral shaped flower bouquet, and optionally fastening by a rope the spiral shaped flower bouquet.

DETAILED DESCRIPTION

The invention will now be described more fully with reference to the appended drawings illustrating typical embodiments of the bouquet-producing tool.

Figure 1:
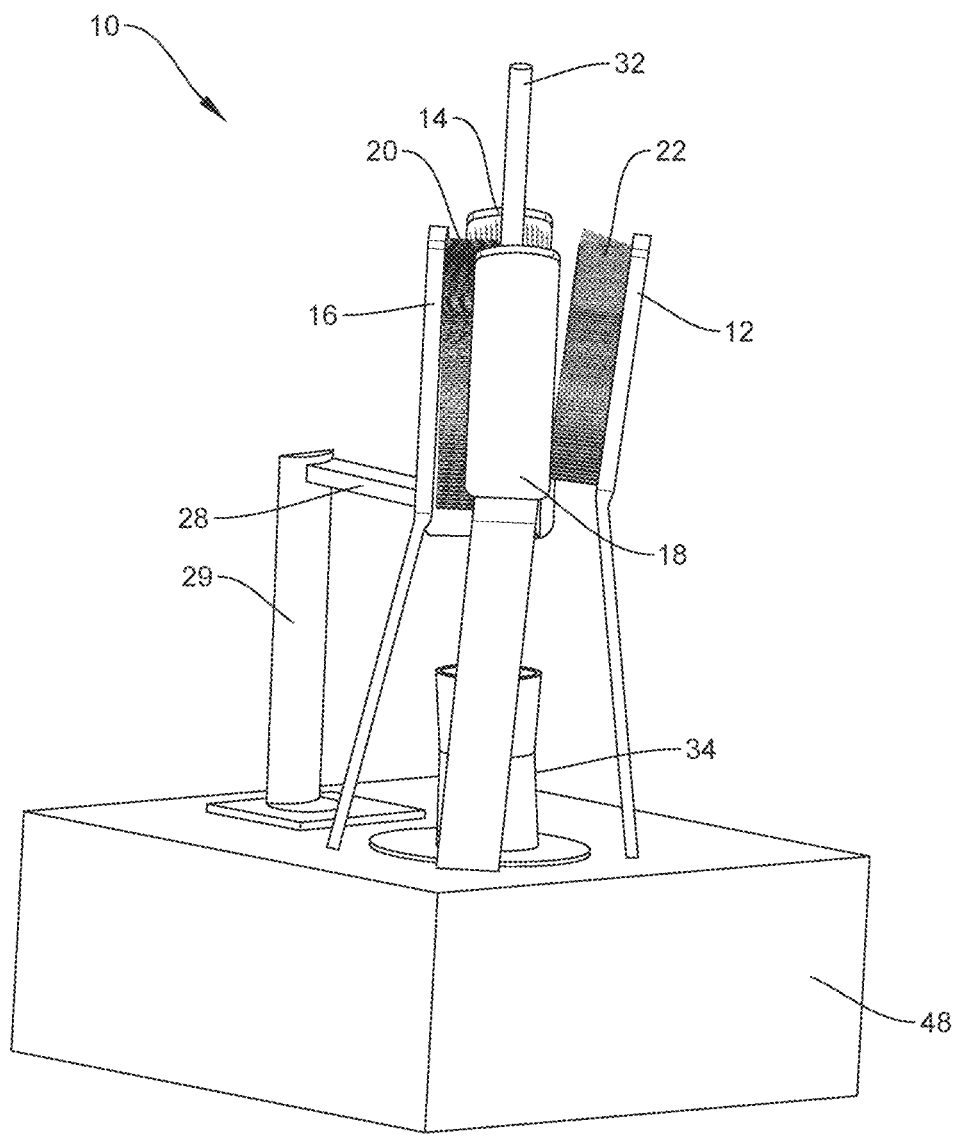
FIG. 1 is a schematic perspective view of a bouquet-producing tool in accordance with the present invention.

These drawings are by no means limiting the scope of the present invention and are only intended to guide the skilled person for a better understanding of the present invention. Referring to FIG. 1-11, a preferred embodiment of the bouquet-producing tool in accordance with the present invention is shown. Here the apparatus (10) is shown without flowers inserted in the entangled bristles. In FIG. 1 the bouquet producing tool (10) comprises at least one brush-based gripper (12, 14, 16, 18), a finger gripper (24, 26) defined by at least two gripping fingers (24 and 26) which are configured to hold cut flowers, a gripper arm (28) which is configured to move vertically, a column (29) which is configured to rotate and a chassis (48) and a spiral maker (34, 36, 38) defined by an oval shape cylinder (34) which is configured to revolute and give the spiral arrangement to the cut flowers, a disk (40) and an electric motor (42) which is rotating the oval shape cylinder (34). The finger gripper (24, 26) is connected to a horizontal arm (28) which is connected to a column (29) which is further connected to the chassis (48). The finger gripper (24, 26) and the horizontal arm (28) are movable in a vertical plane to adjust the height of the finger gripper to a desired height to hold the flower stems (52). The moving of the finger gripper (24, 26) is typically controlled and adjusted by a digital control unit such as a computer or iPad. It is clear that the height of the column (29), the size of the gripping fingers (24, 26), and the length of the arm (28) may be of different sizes to support the production of flower bouquets with different sizes. The gripping fingers (24, 26) are typically, mobilized to a pneumatic system to inflate the fingers and to hold the stems (52), to ensure not damaging the stems. Typically, the finger gripper (24, 26) is adapted to receive current from for instance a power cable. The wall (36) of the cylinder (34) is preferably made from steel, plastic, polymer, or wood, and the floor of the bottom part (42) preferably is made of leather, wool, rubber, or textile. During the process of making the flower bouquet the second gripper (24, 26) holds the cut flowers (52) during the entire process of producing bouquets, wherein it takes the upper side of the stems of the cut flowers, transport the flowers, puts the bottom of the flower stems in the oval shape cylinder and delivers the flower bouquet. All sizes of the various parts of the apparatus are depending on the type of flowers and size of desired bouquets to be made thus for instance, the size of the oval-shaped cylinder (34) and the size of the second gripper (24,26), comprising soft gripping fingers (24,26), may change depending on the size of the desired flower bouquet to be produced.

Figure 2:
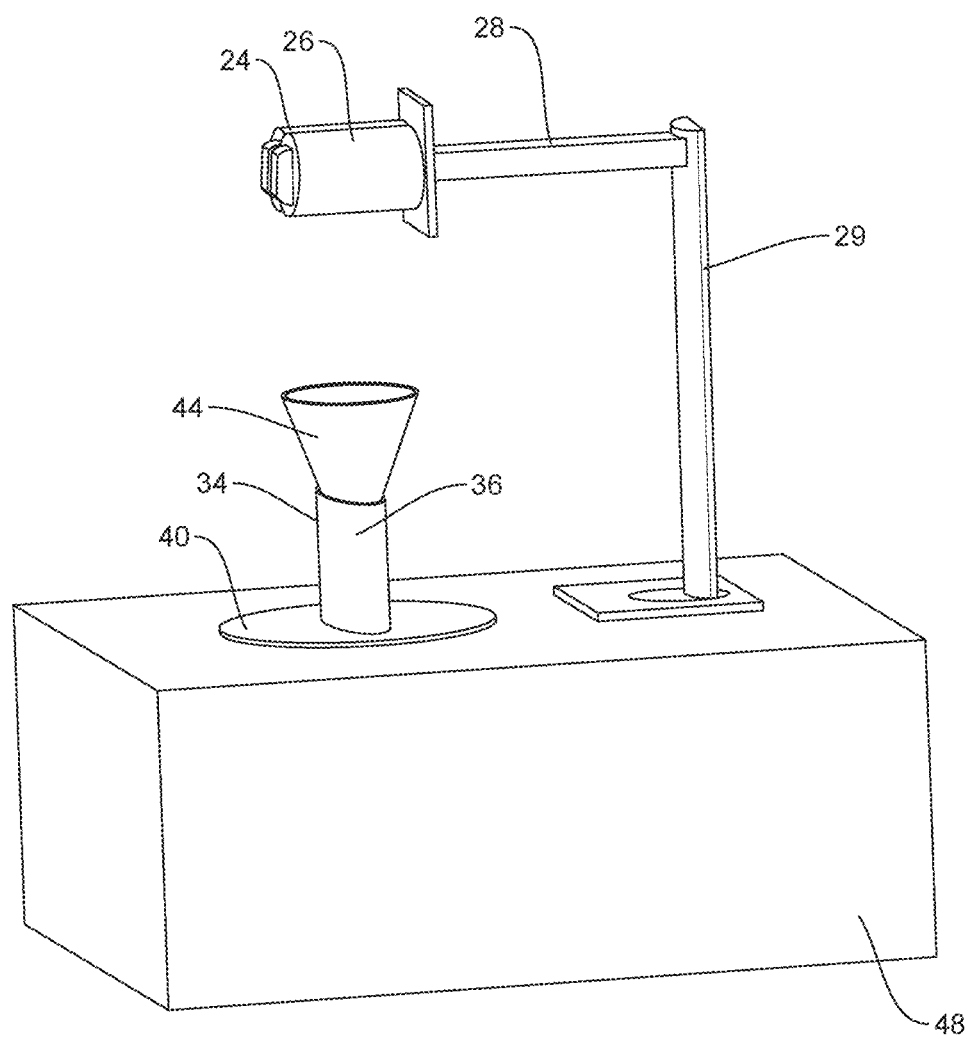
FIG. 2 is a schematic view of the finger gripper and spiral maker in accordance with the present invention.

A schematic perspective view of the finger gripper and spiral maker is shown in FIG. 2. A motor, such as an electrical motor, is connected to the spiral maker (34) and the disk (40). The disk (40) connected to the spiral maker (34) is adapted to rotate and thereby rotate the spiral maker, wherein the disk (40) is configured to block water droplets leaking from the flowers (52) to the electric motor. The rotatable disk (40) is located in the chassis (48) and can rotate as desired when for instance current is applied to the motor. Furthermore, the arm (28) holding the gripping fingers (24,26) is movable in a vertical direction when the apparatus (10) is connected to the support means (48). All parts connected to the chassis (48) may be attached and detached to clean and otherwise service the apparatus to extend the lifetime of said apparatus and its parts.

Figure 3:
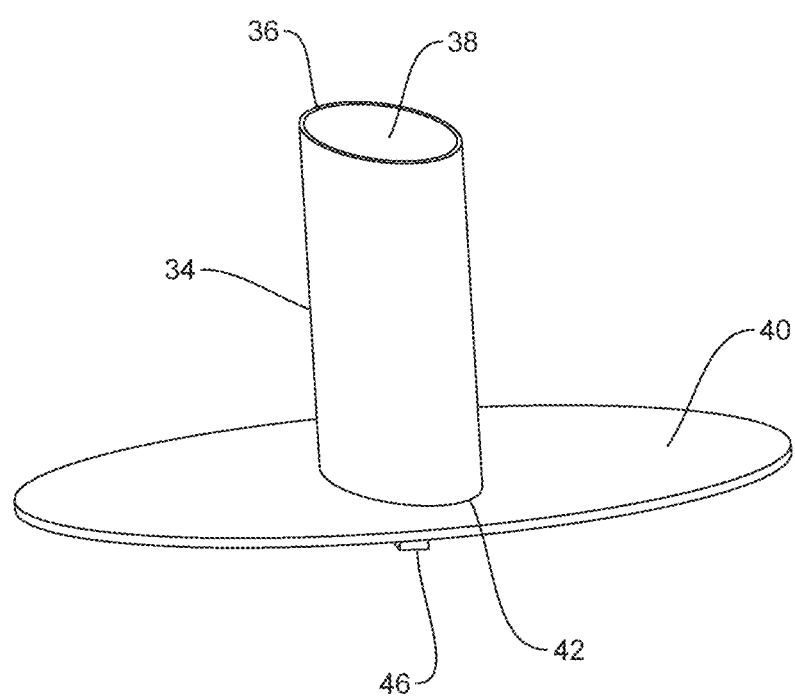
FIG. 3 is a schematic perspective view of the spiral maker in accordance with the present invention.
Figure 7:
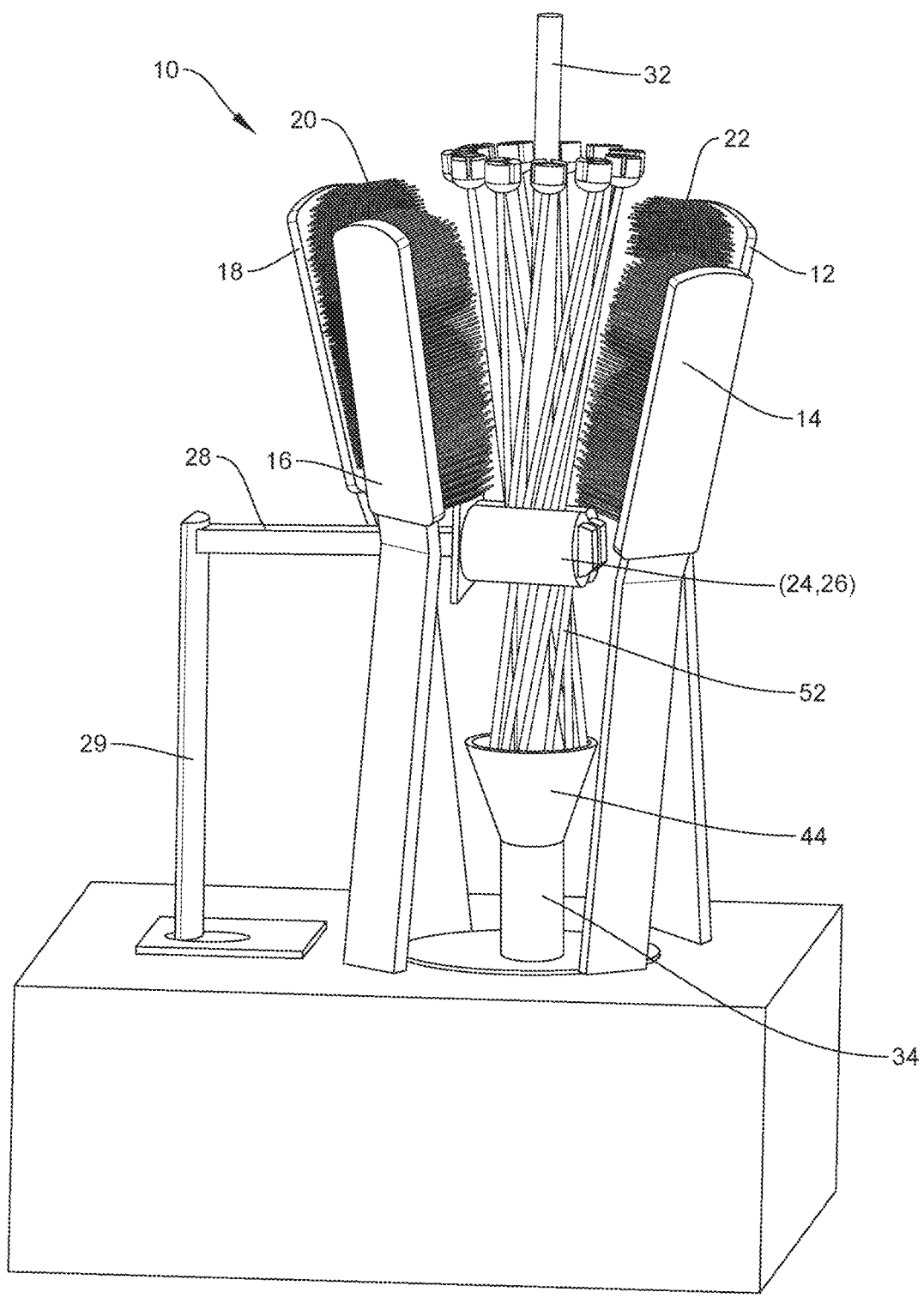
FIG. 7 is a schematic perspective view of the bouquet-producing tool in accordance with the present invention.

FIG. 3 illustrates the schematic perspective view of the spiral maker of FIGS. 1, 2 and 7 wherein the cylinder (34) is rotated by a motor, such as an electric motor (46), at a rotational speed sufficient to make the desired flower bouquet in a cost-effective manner without damaging the flowers and the stems, and such speed is typically two to ten revolutions per minute. The rotating cylinder (34) has in inner space defined by the wall (36) and the bottom (42) and opening (38) of the spiral maker (34). The spiral maker (34) is attached to a disk (40) which disk (40) is fixed to the cylinder wall (36) and bottom (42) in order to rotate the spiral maker (34) when current is applied to the electrical motor (46). All parts of the spiral maker can be made and attached and detached to service the spiral maker or optionally the spiral maker is made as an integral part to be connected to the chassis (48) for operation of the apparatus (10).

Figure 4:
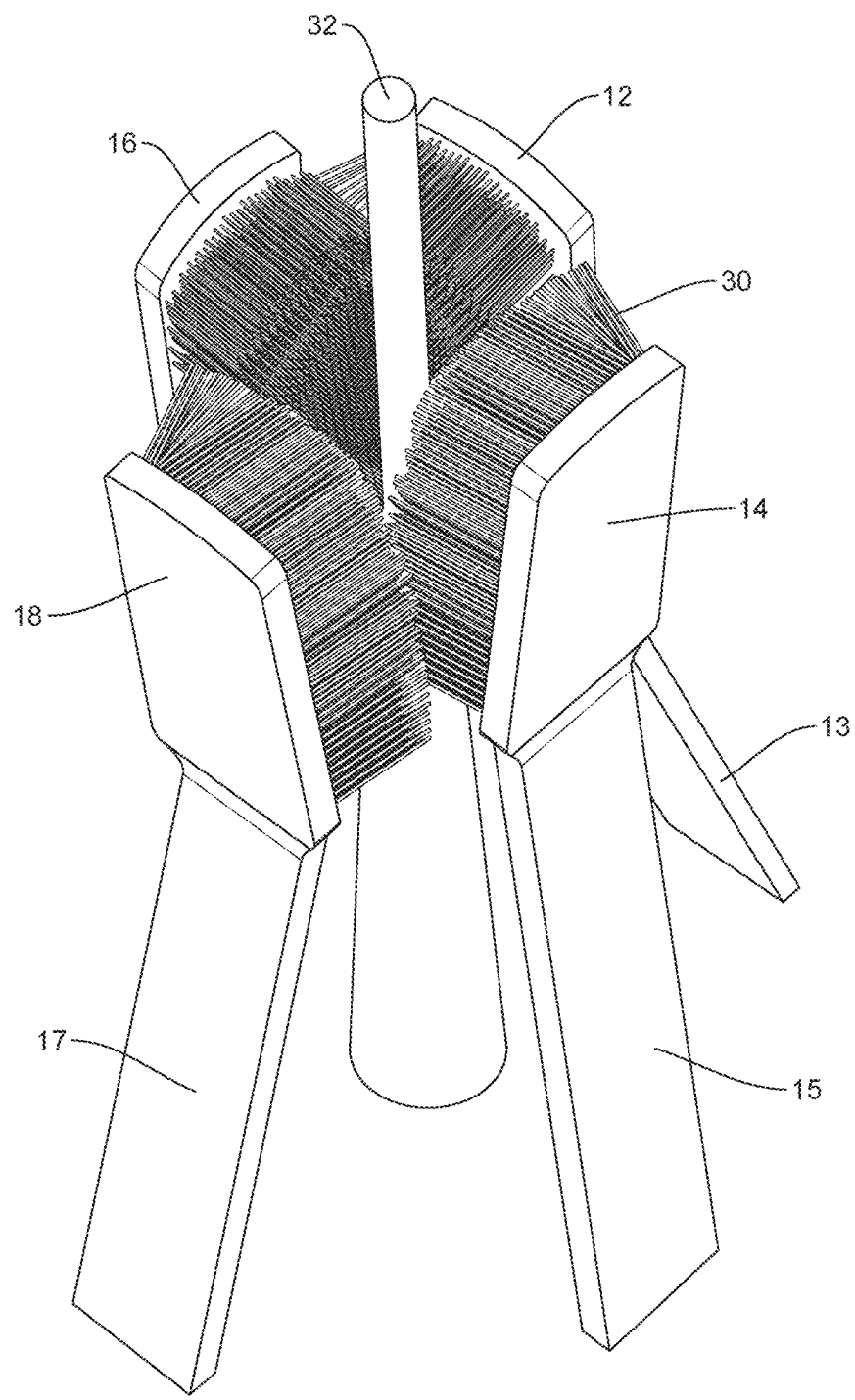
FIG. 4 is a schematic view of the brush gripper and the rod in the middle.

FIG. 4 illustrates the schematic perspective view of the brush-based gripper (12, 14, 16, 18) including four brushes (30) and the rod (32) which is located in the middle of the brush-based gripper. The brushes may be kept tight for instance by a rubber wrap, a string or springs, and typically, the brushes are kept tight for instance by a rubber wrap. As illustrated the rod (32) is placed in the middle to ensure that the flower stems are not crossing each other when making the flower bouquet. The four brush heads (12, 14, 16, 18) are typically connected to supporting means, such as supporting rods (13, 15, 17, 19 in FIG. 5), which supporting means are connected to the chassis (48) and movable as explained above.

Figure 5:
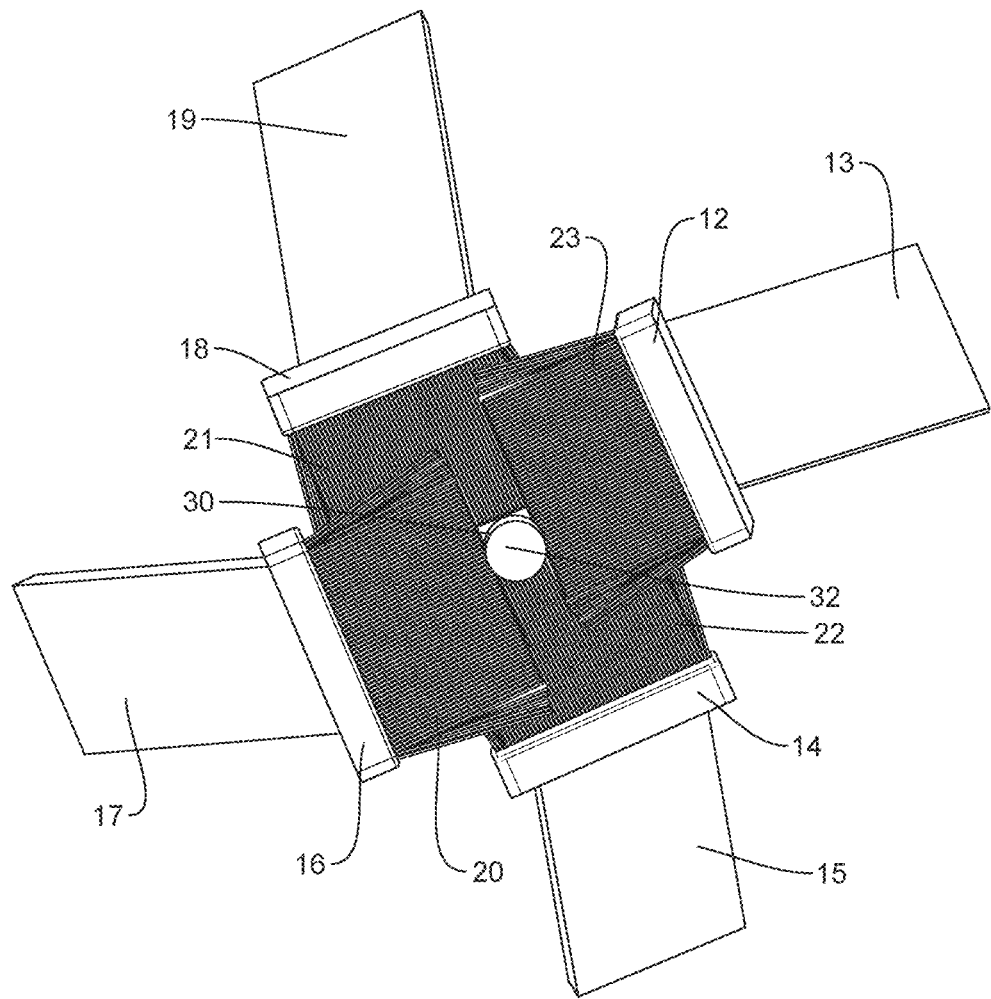
FIG. 5 is a schematic top view of the brush gripper and the rod in accordance with the present invention.

FIG. 5 illustrates the schematic top view of the brush-based gripper (12, 13, 14, 15, 16, 17, 18) and the rod (32) when the bristles are entangled. The brushes are shown with entangled (30) bristles (20, 21, 22, 23) with the rod (32) in the center, wherein there is sufficient friction in the entangled mesh (30) for holding the flower stems at the desired angle and height.

Figure 6:
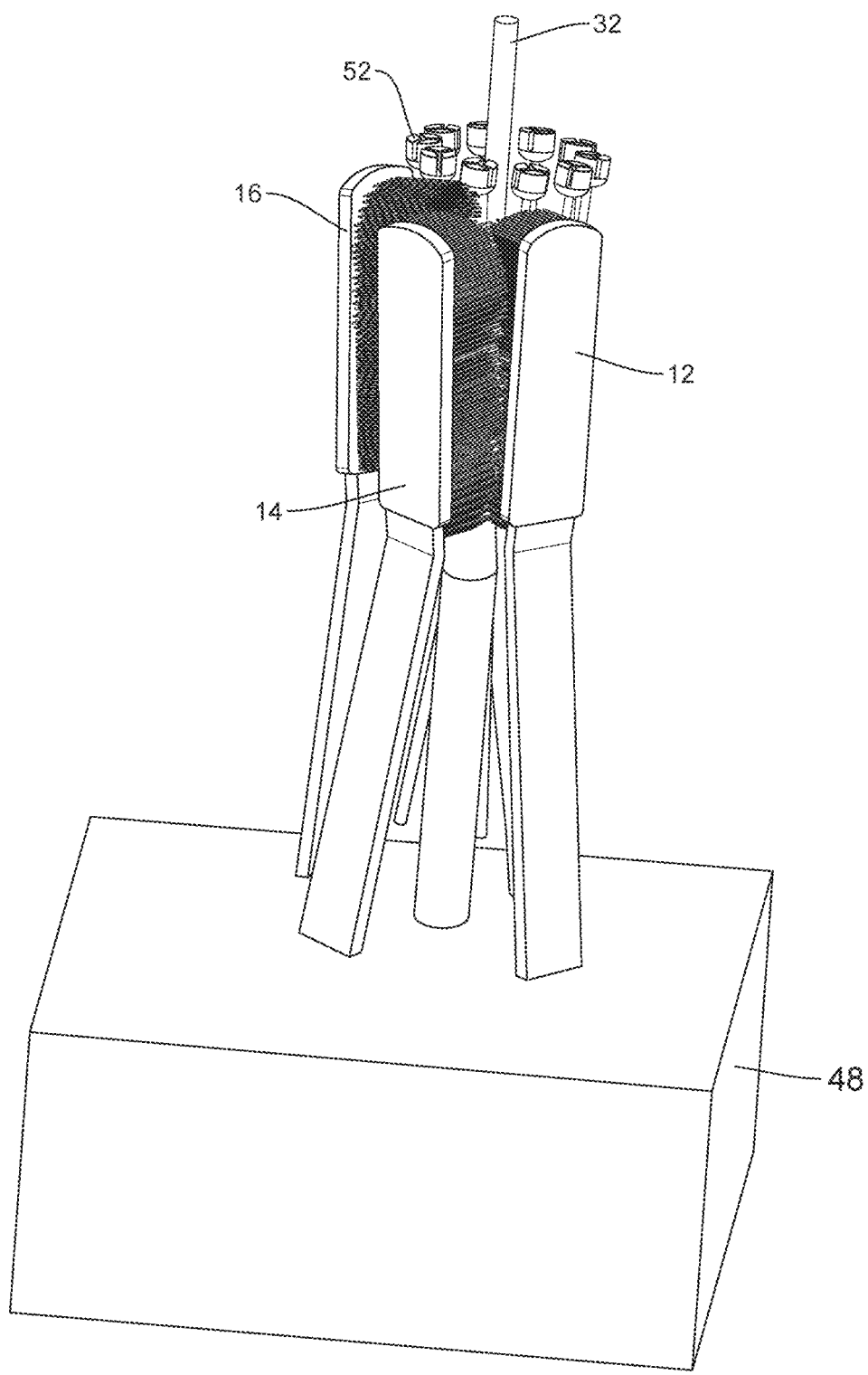
FIG. 6 is a schematic perspective view of the brush gripper holding flowers and fixed to a chassis.

FIG. 6 illustrates the schematic perspective view of. It shows the process of placing the stems of the flowers into the entangled bristles of the brushes. Further, if flower stems are fastened by a rope they may be considered as a bouquet.

FIG. 7 shows a preferred embodiment of the bouquet-producing tool as described above under FIG. 1 with flowers in place. Here the apparatus (10) of FIG. 1 is shown with flower stems released from the brush-based gripper and its bristles.

Figure 8:
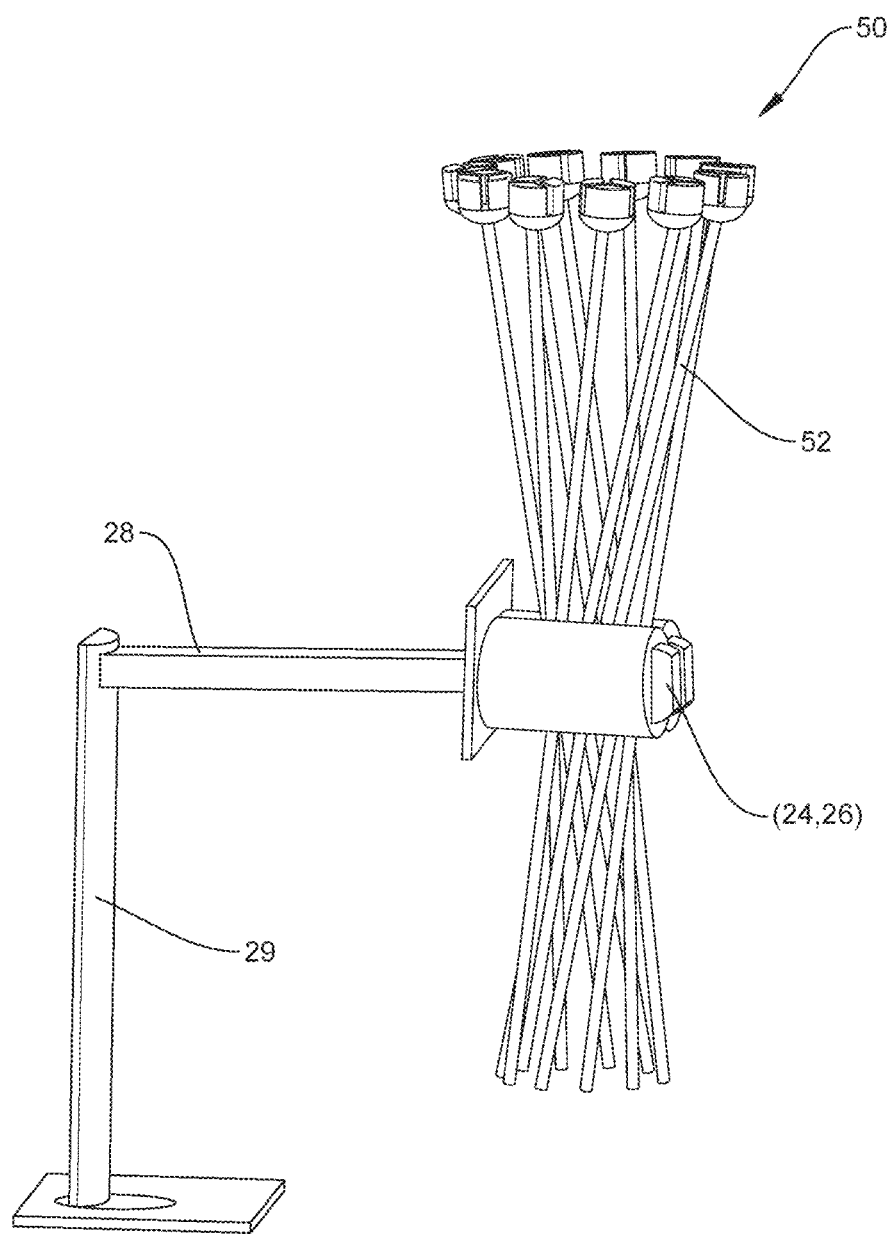
FIG. 8 is a schematic view of the finger gripper holding the prepared bouquet of flowers.

FIG. 8 is a schematic view of the finger gripper (24, 26) holding the prepared bouquet (50) of flowers and stems (52) after preparation using the apparatus of the invention.

Figure 9:
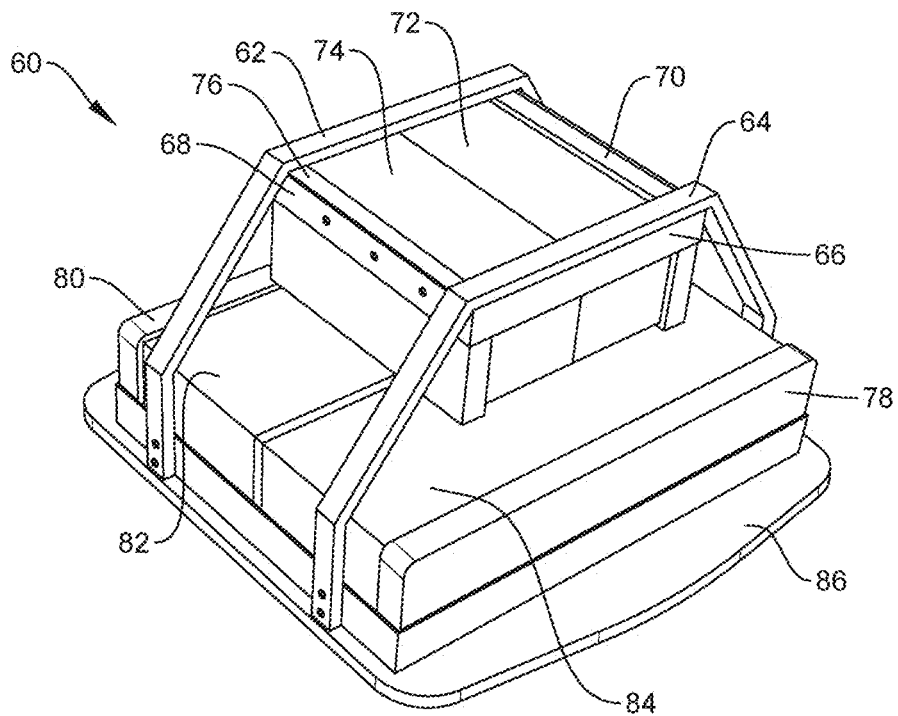
FIG. 9 is a schematic view of a further embodiment of the brush gripper with holding means.
Figure 10:
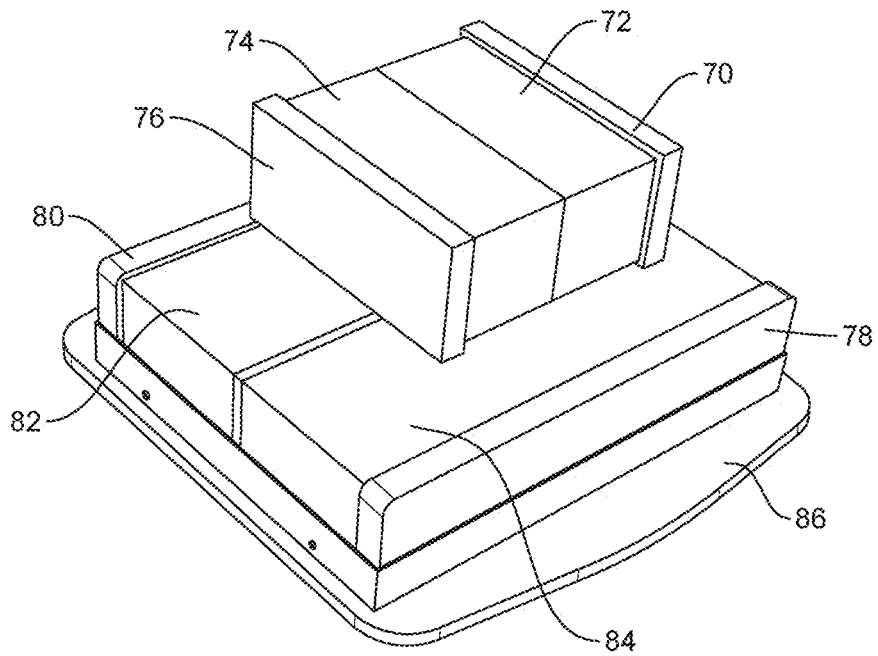
FIG. 10 is a schematic view of the brush gripper in FIG. 9.
Figure 11:
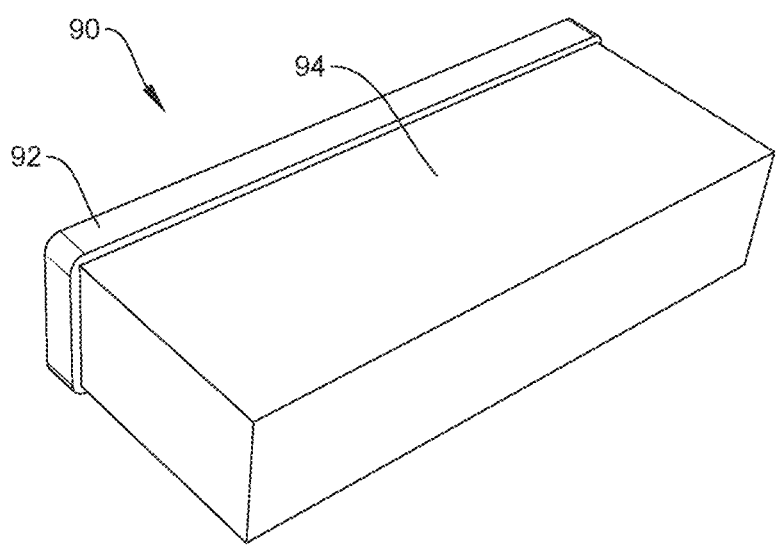
FIG. 11 is a schematic view of one of the brushes of FIGS. 9 and 10.

FIG. 9 is a schematic view of the first gripper (60) comprising four gripping elements (70, 72, 74, 76, 78, 80, 82, 84), wherein each gripping element comprises a brush head comprising multiple bristles (72, 74, 82, 84). In this embodiment the brush-based gripper of this invention, the upper brushes (70, 72, 74, 76) are tightly packed together using a frame (66, 68) that is connected to the frame (62, 64, 86) of the lower brushes (78, 80, 82, 84) with no movement allowed between the upper and lower brushes. Here the upper brushes (70, 72, 74, 76) are constructed with lengths ranging from 15 cm to 30 cm. The lower brushes (78, 80, 82, 84) have lengths ranging from 35 cm to 55 cm and are secured in place by the frame (62, 64, 66, 68, 86) made from metal, plastic, or wood, ensuring that the hairs remain tightly packed together. Although the bristles are not shown individually (but marked as a whole) on this FIG. 9, the multiple bristles (72, 74, 82, 84) are the same as shown in FIGS. 1, 4, 5 and 6. FIG. 10 shows the same embodiment as FIG. 9 without the frame. Here is illustrated the larger surface area created by the lower brushes, making it possible to handle larger bouquets with ease. Although the bristles are not shown individually (but marked as a whole) on this FIG. 10, the multiple bristles (72, 74, 82, 84) are the same as shown in FIGS. 1, 4, 5 and 6. FIG. 11 shows one of the lower gripping elements (90) having a brush head (92, 94) with a length between 35 cm and 55 cm. Although the bristles are not shown individually (but marked as a whole) on this FIG. 11, the multiple bristles (94) are the same as shown in FIGS. 1, 4, 5 and 6.

All references, including publications, patent applications, and patents, cited herein are hereby incorporated by reference to the same extent as if each reference was individually and specifically indicated to be incorporated by reference and was set forth in its entirety herein. All headings and subheadings are used herein for convenience only and should not be construed as limiting the invention in any way.

Any combination of the above-described elements in all possible variations thereof is encompassed by the invention unless otherwise indicated herein or otherwise clearly contradicted by context.

Recitation of ranges of values herein is merely intended to serve as a short method of referring individually to each separate value falling within the range, unless otherwise indicated herein, and each separate value is incorporated into the specification as if it were individually recited herein.

Unless otherwise stated, all exact values provided herein are representative of corresponding approximate values (e.g., all exact exemplary values provided with respect to a particular factor or measurement can be considered to also provide a corresponding approximate measurement, modified by "about", where appropriate).

The method of producing spirally shaped flower bouquets by this invention may comprise inserting the flowers to the oval shape cylinder by the gripper, giving spiral arrangement by rotating cylinder and moving the fastened flowers outside of the water cleaning unit.

All methods described herein can be performed in any suitable order unless otherwise indicated herein or otherwise clearly contradicted by context.

The terms "a" and "an" and "the" and similar referents as used in the context of describing the invention are to be construed to insert both the singular and plural, unless otherwise indicated herein or clearly contradicted by context. Thus, "a" and "an" and "the" may mean at least one, or one or more.

The use of any and all examples, or exemplary language (e.g., "such as") provided herein, is intended merely to better illuminate the invention and does not pose a limitation on the scope of the invention unless otherwise indicated. No language in the specification should be construed as indicating any element is essential to the practice of the invention unless as much is explicitly stated.

The citation and incorporation of patent documents herein is done for convenience only and does not reflect any view of the validity, patentability and/or enforceability of such patent documents.

The description herein of any aspect or embodiment of the invention using terms such as "comprising", "having", "including" or "containing" with reference to an element or elements is intended to provide support for a similar aspect or embodiment of the invention that "consists of", "consists essentially of", or "substantially comprises" that particular element or elements, unless otherwise stated or clearly contradicted by context (e.g., a composition described herein as comprising a particular element should be understood as also describing a composition consisting of that element, unless otherwise stated or clearly contradicted by context).

The features disclosed in the foregoing description may, both separately and in any combination thereof, be material for realizing the invention in diverse forms thereof.

We claim:

1. An apparatus for preparing a spiral shaped flower bouquet from multiple flowers, each flower having a stem, comprising:
   a) a first gripper system comprising at least two gripping elements, wherein each gripping element comprises a brush head comprising multiple bristles and is movable from a first position where the multiple bristles of each brush head are entangled and forms a mesh to a second position where the multiple bristles of each brush head are remote from each other, wherein said multiple bristles when in the first position are capable of holding the stems of the flowers in the mesh at a desired position and height without breaking the stems,
   b) a second gripper comprising at least two soft finger means, wherein each soft finger means is movable in a substantially horizontal plane from a first position remote from each other to a second position creating a defined space between the at least two soft finger means, which defined space is adapted to hold the stems in the desired position and height, without breaking the stems, and wherein the second gripper when in the second position is movable in a substantially vertical direction to position the stems in a desired position,
   c) a removable elongated rod-shaped element having an axis wherein at least a part of the axis is adapted to be positioned in a center of the mesh of the entangled multiple bristles when said multiple bristles are in the first position and wherein the axis is substantially perpendicular to the entangled multiple bristles, wherein the elongated rod-shaped element extends through the defined space between the at least two soft finger means of the second gripper, and wherein said elongated rod-shaped element is for ensuring that the flower stems are not crossing each other, and
   d) a rotatable container having a space surrounded by a wall and an opening, wherein the opening faces the first gripper system when in a first position and the second gripper when in a second position and is adapted to receive the ends of the stems inside the container, wherein at least a part of the space is adapted to receive and hold the ends of the stems wherein the wall surrounding the space has an oval shape, and wherein the container is adapted to rotate clock-wise or counter clock-wise relative to the axis of the elongated rod-shaped element when positioned in the center of the mesh to create the spiral shaped flower bouquet.

2. The apparatus of claim 1, wherein the rotatable container has a disc element supporting an end of the container facing away from the opening, wherein the disc element has a flat surface facing the end of the container and wherein the flat surface extends beyond the wall of the container.

3. The apparatus of claim 2, wherein the rotatable container has a funnel for guiding the ends of the stems which funnel has conical shape extending from the opening of the container to receive and guide the ends of the stems inside the container.

4. The apparatus of claim 1 comprising an electrical motor adapted to rotate the container when current is applied.

5. The apparatus of claim 1 wherein the first gripper system comprises three or four gripping elements.

6. The apparatus of claim 1 wherein the multiple bristles are made from a plastic material.

7. The apparatus of claim 1 wherein the second gripper comprises two soft finger means wherein each finger means is elongated and made of a soft material to avoid breaking the stems.

8. The apparatus of claim 1 wherein each of the first gripper system, the second gripper, the removable elongated rod-shaped element and the rotatable container, are fixed to a support element to perform the rotating movements when in operation.

9. The apparatus of claim 8 wherein the support element is a chassis.

10. The apparatus of claim 2 wherein the rotatable container is an integrated part of the disc element and can be detached for cleaning purposes.

11. The apparatus of claim 1 wherein the diameter of the oval shaped part of the container is larger than the smallest diameter of the multiple flower stems of the spiral shaped flower bouquet.

12. The apparatus of claim 1 wherein the first gripper system comprises at least two gripping elements, wherein each gripping element comprises a brush head comprising multiple bristles wherein the multiple bristles, have a length of at least 6 centimeters.

13. The apparatus of claim 1 wherein each brush head has an elongated shape having a first end and a second end opposite each other, wherein the first end is rotatably attached to a support element and the second end is movable from a non-tilted position where the multiple bristles of each brush head are entangled and form a mesh, to a tilted position where the multiple bristles of each brush head are remote from each other and vice versa, wherein the first end is adapted to rotate about an axis perpendicular to the elongated shape of each brush head.

14. The apparatus of claim 1 wherein each flower has a cut stem, and wherein each stem independently has a similar or a different stem length and/or a similar or different stem diameter.

15. A method of making a spiral shaped flower bouquet from multiple flowers comprising inserting the stems of the flowers in the apparatus of claim 1 and pressing and releasing the stems of flowers when they are held by the second gripper and rotated in the rotatable container, so the stems are placed in an arrangement to have the most stable position which is the spiral shape.

16. A method of making a spiral shaped flower bouquet from multiple flowers in an apparatus comprising
   a) a first gripper system comprising at least two gripping elements, wherein each gripping element comprises a brush head comprising multiple bristles and is movable from a first position where the multiple bristles of each brush head are entangled and forms a mesh to a second position where the multiple bristles of each brush head are remote from each other, wherein said multiple bristles when in the first position are capable of holding the stems of the flowers in the mesh at a desired position and height without breaking the stems, b) a second gripper comprising at least two soft finger means, wherein each soft finger mean is movable in a substantially horizontal plane from a first position remote from each other to a second position creating a defined space between the at least two soft finger means, which defined space is adapted to hold the stems in the desired position and height, without breaking the stems, and wherein the second gripper when in the second position is movable in a substantially vertical direction to position the stems in a desired position, c) a removable elongated rod-shaped element having an axis wherein at least a part of the axis is adapted to be positioned in a center of the mesh of the entangled multiple bristles when said multiple bristles are in the first position and wherein the axis is substantially perpendicular to the entangled multiple bristles, wherein the elongated rod-shaped element extends through the defined space between the at least two soft finger means of the second gripper, and wherein said elongated rod-shaped element is for ensuring that the flower stems are not crossing each other, and d) a rotatable container having a space surrounded by a wall and an opening, wherein the opening faces the first gripper system when in a first position and the second gripper when in a second position and is adapted to receive the ends of the stems inside the container, wherein at least a part of the space is adapted to receive and hold the ends of the stems wherein the wall surrounding the space has an oval shape, and wherein the container is adapted to rotate clock-wise or counter clock-wise relative to the axis of the elongated rod-shaped element when positioned in the center of the mesh to create the spiral shaped flower bouquet;

inserting each flower stem at a desired height and orientation inside the entangled mesh, holding the flowers softly with the second gripper in the second position, rotating the inserted flowers by the rotatable container while they are held by the second gripper in the second position to create the spiral shaped flower bouquet, and fastening the spiral shaped flower bouquet.

\* \* \* \* \*